T861060

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 29, 1969

861 O.G. 1358

782,704

SEQUENTIAL PHOTOMETER FOR MEASURING OUTPUT OF A VEHICLE MOUNTED LAMP

William N. Moroney, Detroit, Mich., assignor to Ford Motor Company, Dearborn, Mich., a corporation of Delaware

Filed Dec. 10, 1968. Published Apr. 29, 1969
Int. Cl. G01j *1/00;* H01j *39/12*
U.S. Cl. 356—121
1 Sheet Drawing. 6 Pages Specification

A testing apparatus for photometrically testing the light distributive candlepower of vehicle mountable lamp assemblies. The lamp (13) to be tested is positioned in predetermined relationship to a plurality of photocells (15) each of which is located at a specific test point. The surface of each photocell is located an equal radial distance from the lamp filament. The photocells are sequentially activated by means (16) and the excitation of each cell

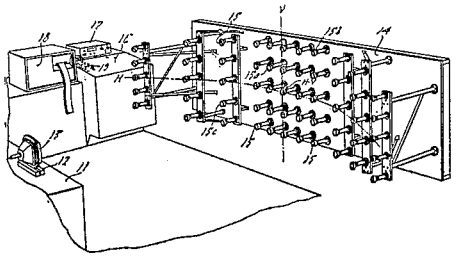

is measured by a digital voltmeter (17) and recorded by a recorder (18) in terms of candlepower value.

T861060
April 29, 1969
W. N. MORONEY
SEQUENTIAL PHOTOMETER FOR MEASURING
OUTPUT OF A VEHICLE MOUNTED LAMP
Filed Dec. 10, 1968
DEF. PUB.
SN - 782704
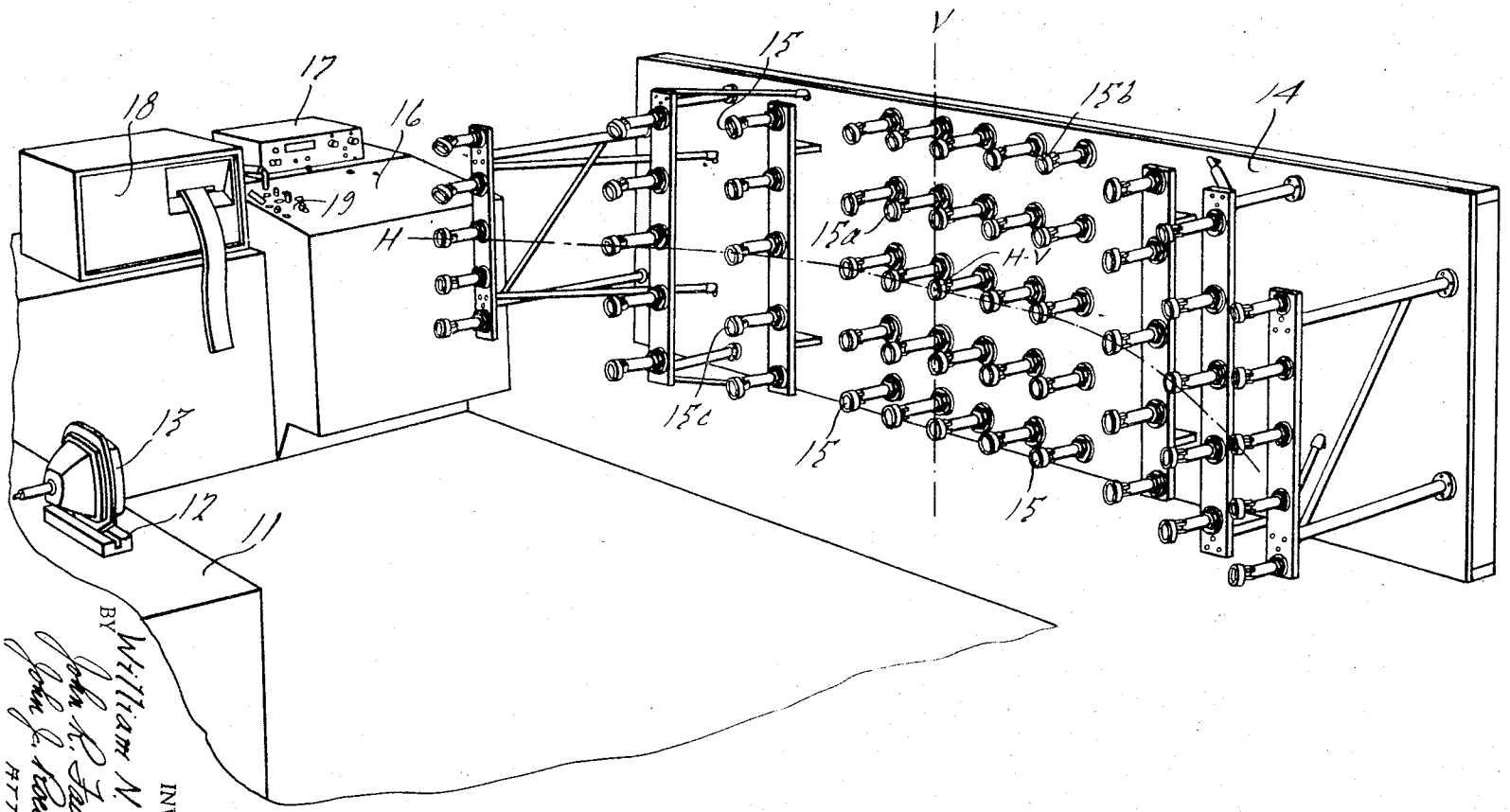
INVENTOR.
BY William N. Moroney.
John R. Faulkner
John J. Roethel
ATTORNEYS.